United States Patent
Chaudhry et al.

(10) Patent No.: US 7,519,775 B2
(45) Date of Patent: Apr. 14, 2009

(54) ENFORCING MEMORY-REFERENCE ORDERING REQUIREMENTS AT THE L2 CACHE LEVEL

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 344 days.

(21) Appl. No.: 11/592,835

(22) Filed: Nov. 3, 2006

(65) Prior Publication Data

US 2007/0198778 A1    Aug. 23, 2007

Related U.S. Application Data

(60) Provisional application No. 60/776,447, filed on Feb. 23, 2006.

(51) Int. Cl.
*G06F 12/00* (2006.01)
(52) U.S. Cl. .................. 711/122; 711/144; 711/156
(58) Field of Classification Search ............. 711/122, 711/144, 156
See application file for complete search history.

(56) References Cited

U.S. PATENT DOCUMENTS

| | | | | | |
|---|---|---|---|---|---|
| 5,359,723 | A | * | 10/1994 | Mathews et al. | 711/122 |
| 5,636,355 | A | * | 6/1997 | Ramakrishnan et al. | 711/113 |
| 5,664,154 | A | * | 9/1997 | Purcell et al. | 711/167 |
| 7,114,060 | B2 | * | 9/2006 | Chaudhry et al. | 712/219 |
| 7,293,161 | B1 | * | 11/2007 | Chaudhry et al. | 712/216 |
| 2004/0162951 | A1 | * | 8/2004 | Jacobson et al. | 711/143 |

* cited by examiner

*Primary Examiner*—Stephen C Elmore
(74) *Attorney, Agent, or Firm*—Park, Vaughan & Fleming LLP

(57) ABSTRACT

One embodiment of the present invention provides a system that enforces memory-reference ordering requirements at an L2 cache. During operation, the system receives a load at the L2 cache, wherein the load previously caused a miss at an L1 cache. Upon receiving the load, the system performs a lookup for the load in reflections of store buffers associated with other L1 caches. These reflections are located at the L2 cache, and each reflection contains addresses for stores in a corresponding store buffer associated with an L1 cache, and possibly contains data that was overwritten by the stores. If the lookup generates a hit, which indicates that the load may potentially interfere with a store, the system causes the load to wait to execute until the store commits.

20 Claims, 4 Drawing Sheets

ENFORCING MEMORY-REFERENCE ORDERING REQUIREMENTS AT THE L2 CACHE LEVEL

RELATED APPLICATION

This application hereby claims priority under 35 U.S.C.§119 to U.S. Provisional Patent Application No. 60/776,477, filed on 23 Feb. 2006, entitled "Enforcing Memory-Reference Ordering Requirements at the L2 Cache Level," by inventors Shailender Chaudhry and Marc Tremblay.

BACKGROUND

1. Field of the Invention

The present invention relates to techniques for improving computer system performance. More specifically, the present invention relates to a method and an apparatus for enforcing memory-reference ordering-requirements, such as Total Store Ordering (TSO), at the L2 cache level.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of forms of "speculative execution" have been proposed or are presently used to hide this cache-miss latency. Some processors support out-of-order execution, in which instructions are kept in an issue queue, and are issued "out-of-order" when operands become available. A given instruction is retired from the issue queue only when all preceding instructions have completed.

Some processor designers have proposed generating a checkpoint and entering a "scout mode" during processor stall conditions. In scout mode, instructions are speculatively executed to prefetch future loads and stores, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. This solution to the latency problem eliminates the complexity of the issue queue. However, it suffers from the disadvantage of having to re-compute results of computational operations that were performed during scout mode.

To avoid performing these re-computations, processor designers have proposed entering an "execute-ahead" mode, wherein instructions that cannot be executed because of unresolved data dependencies are deferred, and wherein other non-deferred instructions are executed in program order. When an unresolved data dependency is ultimately resolved during execute-ahead mode, the system executes deferred instructions in a deferred mode, wherein deferred instructions that able to be executed are executed in program order, and wherein other deferred instructions that still cannot be executed because of unresolved data dependencies are deferred again. For example, see U.S. patent application Ser. No. 10/686,061, filed 14 Oct. 2003, entitled, "Selectively Deferring the Execution of Instructions with Unresolved Data Dependencies as They Are Issued in Program Order," by inventors Shailender Chaudhry and Marc Tremblay.

One problem with the above-described techniques for performing speculative execution is that it is hard to ensure that a multiprocessor adheres to a specific memory model, such as Total Store Ordering (TSO), as is required for correct operation of many parallel applications. For example, for a given thread, the TSO memory model requires that: (1) any two loads must complete in program order; (2) any two stores must complete in program order; (3) any store must complete after an earlier load in program order. However, note that loads can overtake subsequent stores if there is no Read-After-Write (RAW) hazard. Furthermore, as is visible between threads in the system, there must be a total ordering of all stores and a partial ordering of loads and stores.

To ensure that memory models (such as TSO) are not violated, systems typically will not release a store from a store buffer unless all preceding stores from the store buffer have completed. This is because store operations overwrite data and it is generally not possible to undo a store operation if a conflict arises. Consequently, if a store operation causes an L2 cache miss, the following stores in the store buffer must wait until the L2 cache miss returns before they can be released. This can seriously degrade system performance.

Hence, what is needed is a method and an apparatus for enforcing memory models, such as TSO, without the performance problems described above.

SUMMARY

One embodiment of the present invention provides a system that enforces memory-reference ordering requirements at an L2 cache. During operation, the system receives a load at the L2 cache, wherein the load previously caused a miss at an L1 cache. Upon receiving the load, the system performs a lookup for the load in reflections of store buffers associated with other L1 caches. These reflections are located at the L2 cache, and each reflection contains addresses for stores in a corresponding store buffer associated with an L1 cache, and possibly contains data that was overwritten by the stores. If the lookup generates a hit, which indicates that the load may potentially interfere with a store, the system causes the load to wait to execute until the store commits.

In a variation on this embodiment, causing the load to wait to execute involves storing the load in a miss buffer associated with the L2 cache, wherein the miss buffer also contains loads that are waiting for data to return from L2 cache misses.

In a variation on this embodiment, causing the load to wait to execute involves causing the L1 cache to resend the load to the L2 cache.

In a variation on this embodiment, if the lookup for the load does not generate a hit, the system processes the load by performing a lookup for the load in the L2 cache and, if necessary, processing a resulting L2 cache miss.

In a variation on this embodiment, upon receiving a store from an L1 cache at the L2 cache, the system performs a lookup for the store in reflections of the store buffers associated with other L1 caches. If the lookup does not generate a hit, thereby indicating that the store does not interfere with other stores, the system performs the store. This involves performing a read-modify-write operation which overwrites an original dataword in a corresponding L2 cache line with a new data word and returns the original dataword. It also involves storing the original data word along with a corresponding address in a reflection of a store buffer associated with the L1 cache, and then sending an acknowledgement that the store has completed to the L1 cache.

In a further variation, if the lookup for the store generates a hit in a reflection of a higher-priority store buffer associated with a higher-priority L1 cache, which indicates the store is a lower-priority store which is interfering with a higher-priority store in the higher-priority store buffer, the system causes the lower-priority store to wait to execute until the higher-priority store commits.

In a further variation, if the lookup for the store generates a hit in a reflection of a lower-priority store buffer associated with a lower-priority L1 cache, which indicates the store is a higher-priority store which is interfering with a lower-priority store in the lower-priority store buffer, the system: (1) undoes the lower-priority store; (2) performs the higher-priority store; and (3) performs the lower-priority store again so that the lower-priority store completes after the higher-priority store.

In a further variation, while undoing the lower-priority store, the system reads an original dataword from an entry associated with the lower-priority store in the reflection of the lower-priority store buffer. The system then performs a read-modify-write operation which overwrites a new dataword (that was previously written by the lower-priority store) in a corresponding L2 cache line with the original dataword and returns new dataword. Finally, the system stores the new dataword in the entry in the reflection of the lower-priority store buffer.

In a further variation, upon receiving an acknowledgement at the L1 cache that the store has completed, the system marks the store buffer at the L1 cache to indicate that the store has completed. If the store is at the head of the store buffer, the system removes the store (and any consecutive completed stores) from the store buffer and sends corresponding invalidation signals to the reflection of the store buffer at the L2 cache to cause corresponding entries to be invalidated.

In a variation on this embodiment, the system determines priority between L1 caches based upon identifiers for processors attached to the L1 caches.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Multiprocessor System

Figure 1:
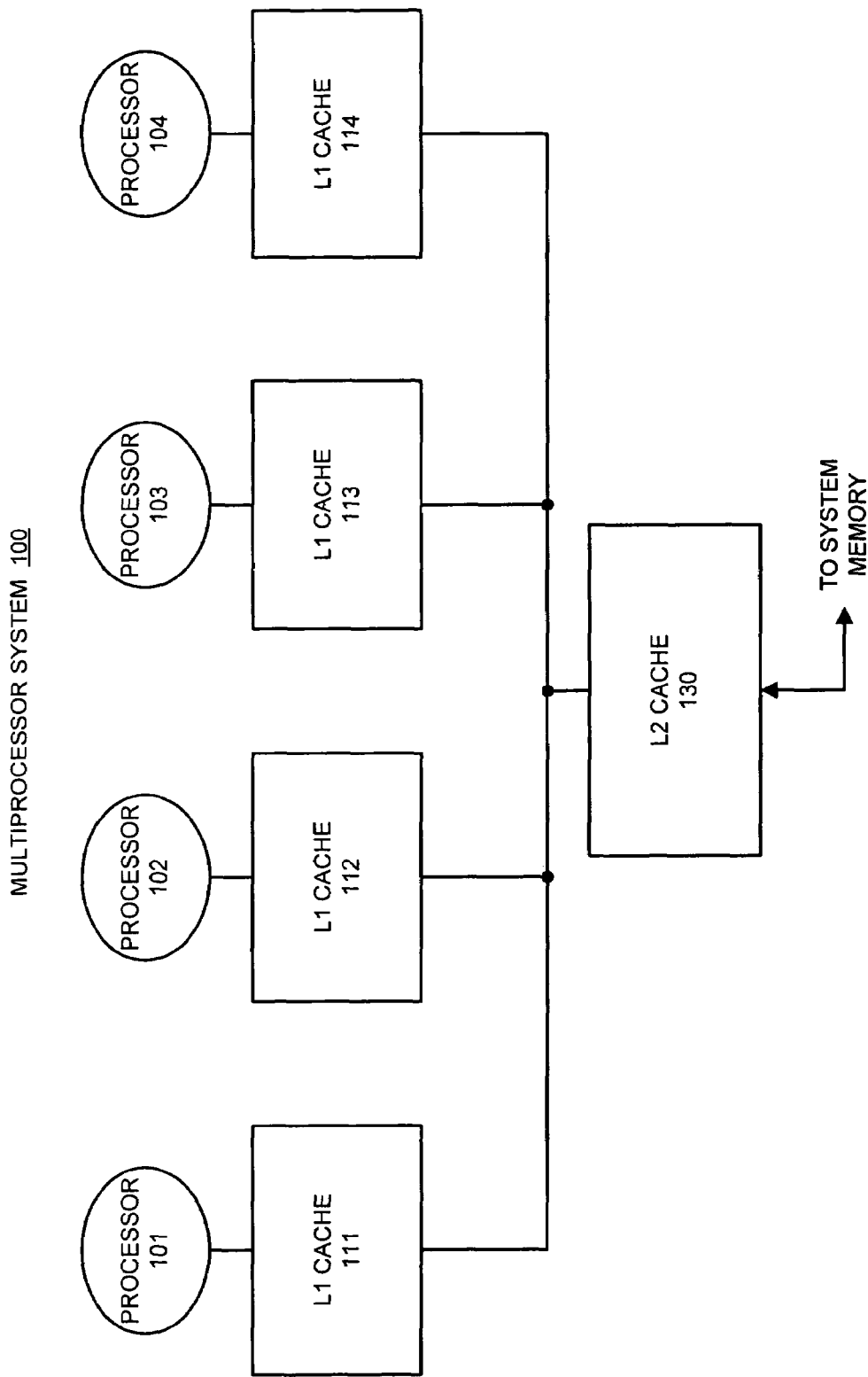
FIG. 1 illustrates a multiprocessor system in accordance with an embodiment of the present invention.

FIG. 1 illustrates a multiprocessor system 100 in accordance with an embodiment of the present invention. Multiprocessor system 100 includes a number of processors 101-104, which are coupled to Level One (L1) caches 111-114, respectively. Note that the L1 caches 111-114 may be separate instruction and data caches, or alternatively, unified instruction/data caches. L1 caches 111-114 are coupled to Level Two (L2) cache 130 through coherence bus 122. L2 cache 130 is coupled to the system memory.

In one embodiment of the present invention, L1 caches 111-114 are write-through caches, which means that all updates to L1 caches 111-114 are automatically propagated to L2 cache 130. This simplifies the coherence protocol, because if processor 101 requires a data item that is present in L1 cache 112, processor 101 can receive the data from L2 cache 130 without having to wait for L1 cache 112 to source the data. Moreover, no forwarding network is needed to allow L1 cache 112 to source the data. In one embodiment of the present invention, L2 cache 130 is an "inclusive cache," which means that all items in L1 caches 111-114 are included in L2 cache 130.

Although the present invention is described with reference to multiprocessor system 100 illustrated in FIG. 1, the present invention is not meant to be limited to the specific multiprocessor system illustrated in FIG. 1 and can in general be applied to any multiprocessor system which includes processors and associated L1 and L2 caches.

L1 and L2 Caches

Figure 2:
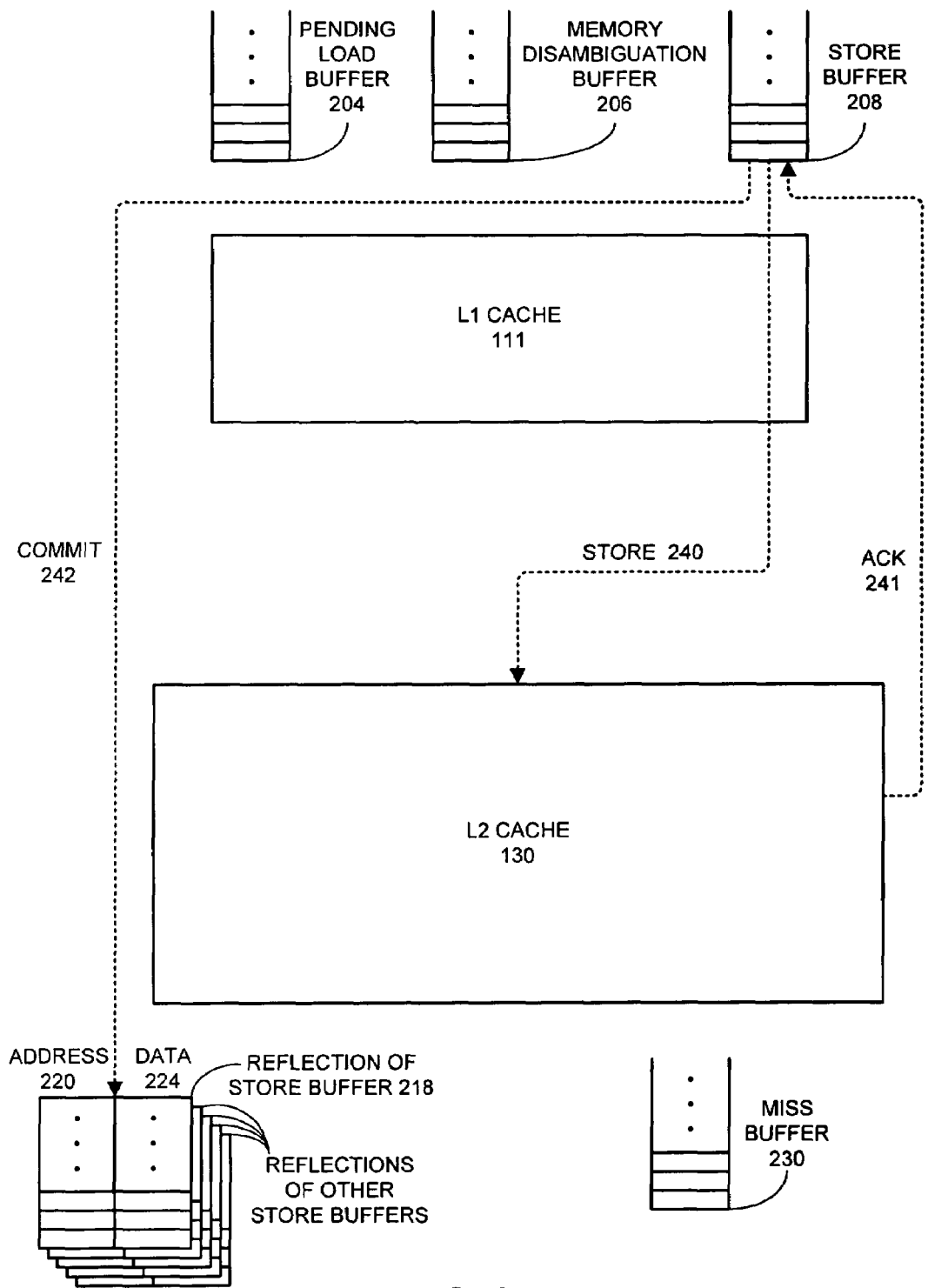
FIG. 2 illustrates an L1 cache and an associated L2 cache in accordance with an embodiment of the present invention.

FIG. 2 provides a more-detailed illustration of L1 cache 111 and L2 130 cache within multiprocessor 100 in accordance with an embodiment of the present invention.

L1 cache 111 is associated with a number of nearby structures, including: pending load buffer 204, memory disambiguation buffer 206 and store buffer 208. Pending load buffer 204 keeps track of pending load operations that have not returned to L1 cache 111 from L1 cache misses. Load disambiguation buffer 206 keeps track of loads that have returned to L1 cache 111 during speculative (out-of-order) execution, but which have not yet been committed to the architectural state of the processor. Store buffer 208 contains stores that have been issued during program execution, but have not yet been written to L1 cache 111 (to be subsequently written-back to L2 cache 130). Note that each entry in store buffer 208 includes a bit (check-mark) which indicates whether the corresponding store has been committed to L2 cache 130.

L2 cache 130 is associated with a number of structures, including miss buffer 230 and reflection of store buffer 218. Miss buffer 230 contains pending loads and stores which are waiting for an L2 cache miss to complete. (Note that the present invention also uses miss buffer 230 to keep track of loads and stores which are waiting for a preceding store to commit. This facilitates enforcing memory-reference ordering requirements as is described in more detail below with reference to the flow charts in FIGS. 3 and 4.)

Reflection of store buffer 218 contains a "reflection" of the entries in store buffer 118. For each entry in store buffer 208, reflection of store buffer 218 contains a corresponding address, and possibly an original data value which was overwritten by the store in L2 cache 130. This original data value can be used to undo a store operation when a conflict arises between store operations as is described below with reference the flow chart in to FIG. 4. Note that L2 cache 130 maintains a separate reflection for each store buffer for each associated L1 cache.

Processing a Load-Miss

The TSO memory model is not violated if stores from different processors execute out-of-order, unless intervening load instructions read the stored values. One embodiment of the present invention detects potential conflicts between a load instruction and preceding store instructions from other processors and then delays the load instruction if a potential conflict is detected.

Figure 3:
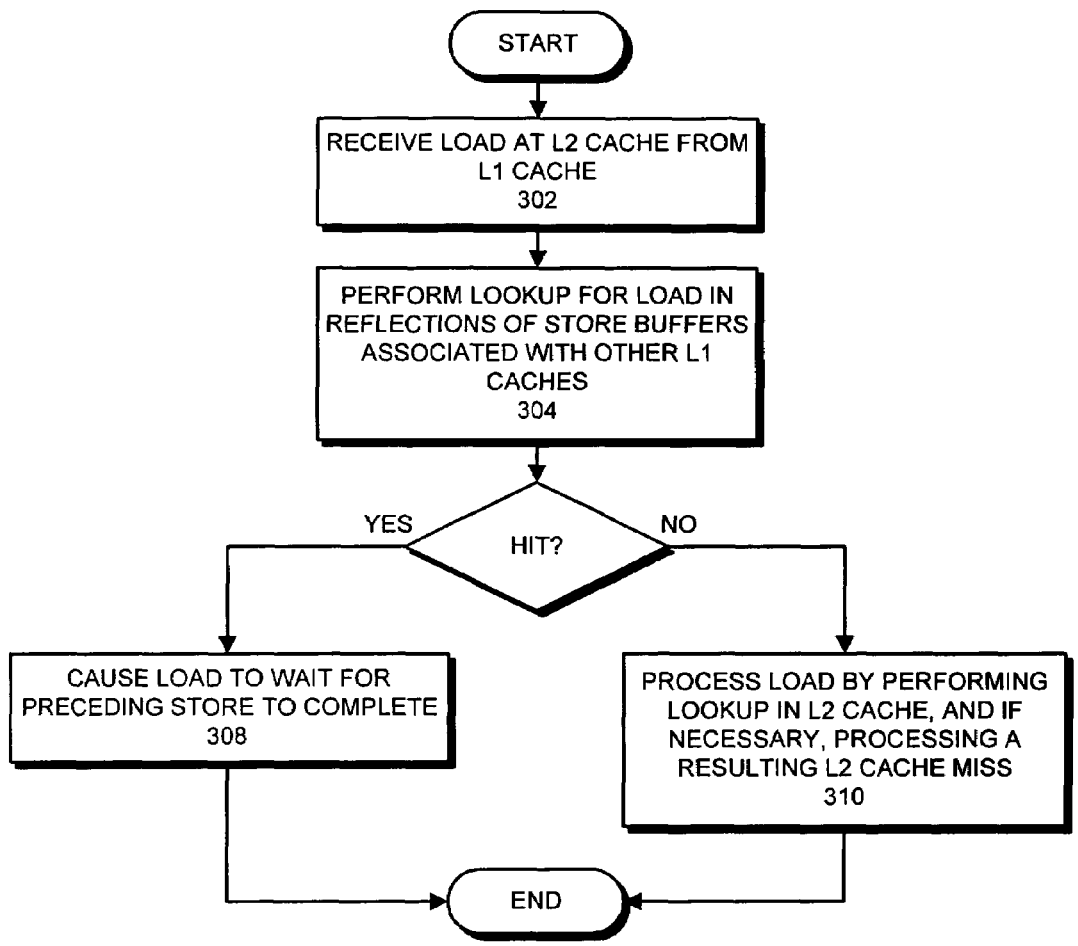
FIG. 3 presents a flow chart illustrating how a load-miss is processed at an L2 cache in accordance with an embodiment of the present invention.

More specifically, FIG. 3 presents a flow chart illustrating how a load which missed in an L1 cache is processed at an associated L2 cache in accordance with an embodiment of the present invention. First, the system receives the load which missed at the L1 cache (step 302). Next, the system performs a lookup for the load in the reflections of other store buffers associated with other L1 caches to detect potentially conflicting stores from other processors (step 304).

If the lookup generates a hit, which indicates that the load might potentially interfere with a preceding store by another processor, the system causes the load to wait for the preceding store to complete (step 308). This can involve placing the load into a miss buffer associated with the L2 cache. However, instead of waiting for a data-return from an L2 cache miss, the load waits for the preceding store to complete. Alternatively, the system can cause the L1 cache to resend the load to the L2 cache.

On the other hand, if the load does not generate a hit, the system processes the load by performing a lookup in the L2 cache and processing a resulting L2 cache miss, if necessary (step 310).

Processing a Store

The TSO memory model will be violated if stores from different processors conflict with each other while executing out-of-order. To deal with this problem, one embodiment of the present invention detects potential conflicts between store instructions from different processors, and then resolves the conflicts based on the priorities of the processors making the stores.

Figure 4:
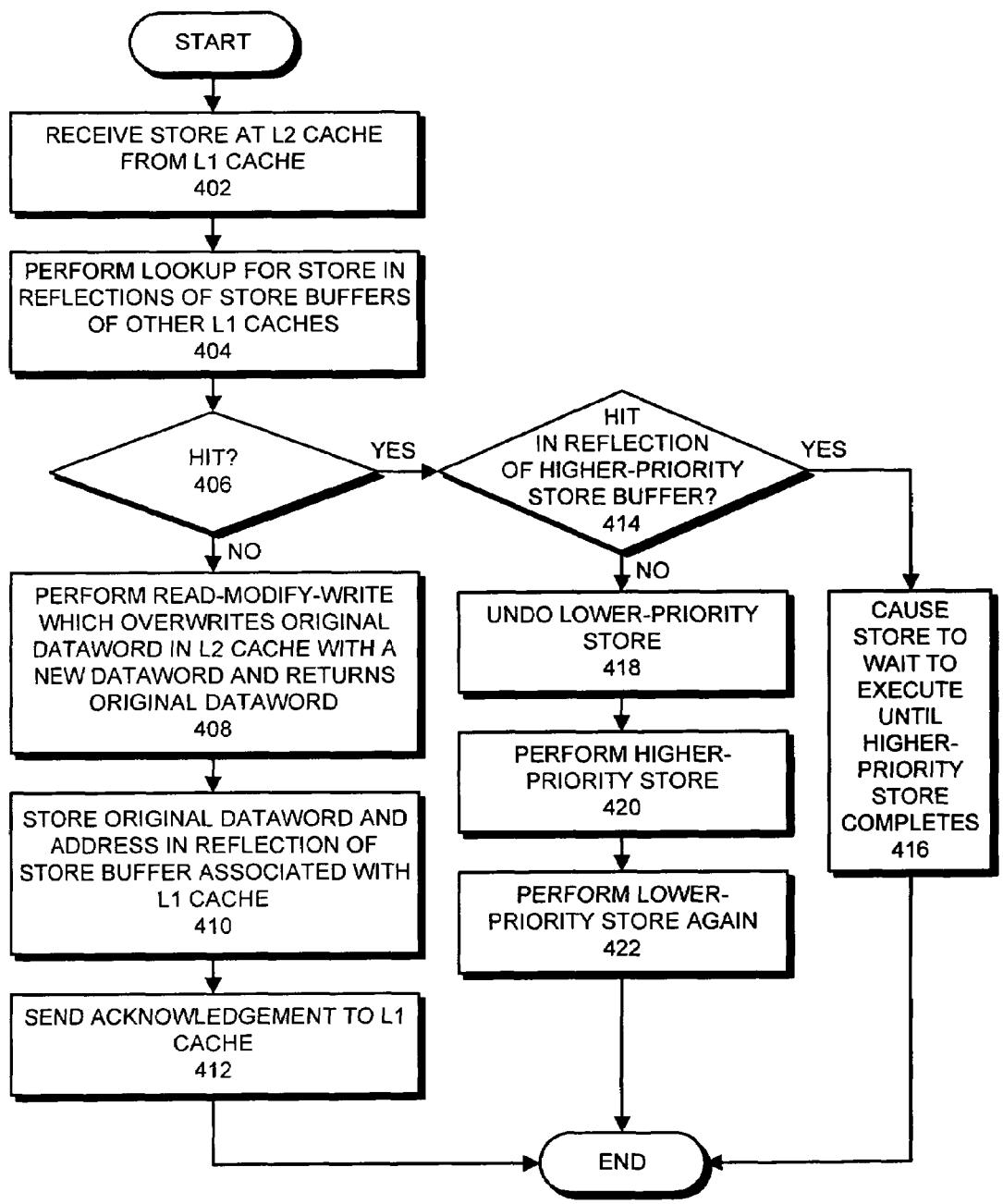
FIG. 4 presents a flow chart illustrating how a store is processed at an L2 cache in accordance with an embodiment of the present invention.

More specifically, FIG. 4 presents a flow chart illustrating how a store is processed at an L2 cache in accordance with an embodiment of the present invention. First, the system receives the store at the L2 cache from the L1 cache (step 402). Note that the L1 cache is a write-through cache, so all stores to the L1 cache are automatically "written-back" to the L2 cache. Next, the system performs a lookup for the store in the reflections of store buffers associated with other L1 caches to detect potentially conflicting stores from other processors (step 404).

If the lookup does not generate a hit, thereby indicating that the store does not interfere with other stores, the system performs the store. This involves performing a read-modify-write operation which overwrites an original dataword in a corresponding L2 cache line with a new data word and returns the original dataword (step 408). It also involves storing the original data word along with a corresponding address in a reflection of a store buffer associated with the L1 cache (step 410), and then sending an acknowledgement that the store has completed to the L1 cache (step 412). (A read-modify-write operation is already supported in many caches to facilitate using an error-correcting code (ECC) to correct bit errors in the cache lines. Hence, the present invention can use existing read-modify-write circuitry to perform this operation.)

If at step 104 the lookup generates a hit, which indicates that the store might potentially interfere with a preceding store by another processor, the system determines if the hit is associated with a higher-priority store buffer (step 414). Note that the priority of the store buffers can be determined by comparing the processor identifiers (IDs) for the processors associated with the store buffers.

If the hit is associated with a higher-priority store buffer, the system causes the store to wait to execute until the higher priority store completes (step 416). This can involve placing the store in a miss buffer associated with the L2 cache. However, instead of waiting for a data-return from an L2 cache miss, the store waits for the preceding higher-priority store to complete.

On the other hand, if the hit is associated with a higher-priority store buffer, which indicates that the store is a higher-priority store which is interfering with a lower-priority store in a lower-priority store buffer, the system: undoes the lower-priority store (step 418); performs the higher-priority store (step 420); and performs the lower-priority store again so that the lower-priority store completes after the higher-priority store (step 422).

Note that to undo the lower-priority store, the system reads an original dataword from an entry associated with the lower-priority store in the reflection of the lower-priority store buffer. The system then performs a read-modify-write operation which overwrites a new dataword (that was previously written by the lower-priority store) in a corresponding L2 cache line with the original dataword and returns new dataword. Finally, the system stores the new dataword in the entry in the reflection of the lower-priority store buffer.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enforcing memory-reference ordering requirements at an L2 cache, comprising:
   receiving a load at the L2 cache, wherein the load previously caused a miss at an L1 cache;
   performing a lookup for the load in reflections of store buffers associated with other L1 caches, wherein the reflections are located at the L2 cache, and wherein each reflection contains addresses for stores in a corresponding store buffer associated with an L1 cache, and possibly data that was overwritten by the stores; and
   if the lookup generates a hit, which indicates that the load may potentially interfere with a store, causing the load to wait to execute until the store commits.

2. The method of claim 1, wherein causing the load to wait to execute involves storing the load in a miss buffer associated with the L2 cache, wherein the miss buffer also contains loads that are waiting for data to return from L2 cache misses.

3. The method of claim 1, wherein causing the load to wait to execute involves causing the L1 cache to resend the load to the L2 cache.

4. The method of claim 1, wherein if the lookup for the load does not generate a hit, the method further comprises processing the load by performing a lookup for the load in the L2 cache and, if necessary, processing a resulting L2 cache miss.

5. The method of claim 1, wherein the method further comprises:
   receiving a store from an L1 cache at the L2 cache;

performing a lookup for the store in reflections of the store buffers associated with other L1 caches; and if the lookup does not generate a hit, thereby indicating that the store does not interfere with other stores, the method further comprises performing the store by, performing a read-modify-write operation which overwrites an original dataword in a corresponding L2 cache line with a new data word and returns the original dataword, storing the original data word along with a corresponding address in a reflection of a store buffer associated with the L1 cache, and sending an acknowledgement that the store has completed to the L1 cache.

6. The method of claim 5, wherein if the lookup for the store generates a hit in a reflection of a higher-priority store buffer associated with a higher-priority L1 cache, thereby indicating the store is a lower-priority store which is interfering with a higher-priority store in the higher-priority store buffer, the method further comprises causing the lower-priority store to wait to execute until the higher-priority store commits.

7. The method of claim 5, wherein if the lookup for the store generates a hit in a reflection of a lower-priority store buffer associated with a lower-priority L1 cache, thereby indicating the store is a higher-priority store which is interfering with a lower-priority store in the lower-priority store buffer, the method further comprises:

undoing the lower-priority store;

performing the higher-priority store; and performing the lower-priority store again so that the lower-priority store completes after the higher-priority store.

8. The method of claim 7, wherein undoing the lower-priority store involves:

reading an original dataword from an entry associated with the lower-priority store in the reflection of the lower-priority store buffer;

performing a read-modify-write operation which overwrites a new dataword (that was previously written by the lower-priority store) in a corresponding L2 cache line with the original dataword and returns new dataword; and storing the new dataword in the entry in the reflection of the lower-priority store buffer.

9. The method of claim 5, wherein the method further comprises:

receiving the acknowledgement that the store has completed at the L1 cache;

marking the store buffer at the L1 cache to indicate that the store has completed; and if the store is at the head of the store buffer, removing the store (and any consecutive completed stores) from the store buffer and sending corresponding invalidation signals to the reflection of the store buffer at the L2 cache to cause corresponding entries to be invalidated.

10. The method of claim 1, further comprising determining a priority between L1 caches based upon identifiers for processors attached to the L1 caches.

11. A multiprocessor system that enforces memory-reference ordering requirements, comprising:

a plurality of processors;

L1 caches coupled to the plurality of processors;

an L2 cache coupled to the L1 caches;

a memory coupled to the L2 cache;

reflections of store buffers associated with the L1 caches, wherein the reflections are located at the L2 cache, and wherein each reflection contains addresses for stores in a corresponding store buffer associated with an L1 cache, and possibly data that was overwritten by the stores;

wherein when the L2 cache receives a load that previously caused a miss at an L1 cache, the multiprocessor system is configured to, perform a lookup for the load in reflections of the store buffers associated with other L1 caches; and if the lookup generates a hit, which indicates that the load may potentially interfere with a store, to cause the load to wait to execute until the store commits.

12. The multiprocessor system of claim 11, further comprising a miss buffer associated with the L2 cache;

wherein while causing the load to wait to execute, the multiprocessor system is configured to store the load in the miss buffer, wherein the miss buffer also contains loads that are waiting for data to return from L2 cache misses.

13. The multiprocessor system of claim 11, wherein while causing the load to wait to execute, the multiprocessor system is configured to cause the L1 cache to resend the load to the L2 cache.

14. The multiprocessor system of claim 11, wherein if the lookup for the load does not generate a hit, the multiprocessor system is configured to process the load by performing a lookup for the load in the L2 cache and, if necessary, processing a resulting L2 cache miss.

15. The multiprocessor system of claim 11, wherein the multiprocessor system is configured to:

receive a store from an L1 cache at the L2 cache; and to perform a lookup for the store in reflections of the store buffers associated with other L1 caches;

wherein if the lookup does not generate a hit, thereby indicating that the store does not interfere with other stores, the multiprocessor system is configured to perform the store by, performing a read-modify-write operation which overwrites an original dataword in a corresponding L2 cache line with a new data word and returns the original dataword, storing the original data word along with a corresponding address in a reflection of a store buffer associated with the L1 cache, and sending an acknowledgement that the store has completed to the L1 cache.

16. The multiprocessor system of claim 15, wherein if the lookup for the store generates a hit in a reflection of a higher-priority store buffer associated with a higher-priority L1 cache, thereby indicating the store is a lower-priority store which is interfering with a higher-priority store in the higher-priority store buffer, the multiprocessor system is configured to cause the lower-priority store to wait to execute until the higher-priority store commits.

17. The multiprocessor system of claim 15, wherein if the lookup for the store generates a hit in a reflection of a lower-priority store buffer associated with a lower-priority L1 cache, thereby indicating the store is a higher-priority store which is interfering with a lower-priority store in the lower-priority store buffer, the multiprocessor system is configured to:

undo the lower-priority store;

perform the higher-priority store; and to perform the lower-priority store again so that the lower-priority store completes after the higher-priority store.

18. The multiprocessor system of claim 17, wherein while undoing the lower-priority store, the multiprocessor system is configured to:

read an original dataword from an entry associated with the lower-priority store in the reflection of the lower-priority store buffer;

perform a read-modify-write operation which overwrites a new dataword (that was previously written by the lower-priority store) in a corresponding L2 cache line with the original dataword and returns new dataword; and to store the new dataword in the reflection of the entry in the lower-priority store buffer.

19. The multiprocessor system of claim 15, wherein the multiprocessor system is configured to:

receive the acknowledgement that the store has completed at the L1 cache;

mark the store buffer at the L1 cache to indicate that the store has completed; and if the store is at the head of the store buffer, to remove the store (and any consecutive completed stores) from the store buffer, and to send corresponding invalidation signals to the reflection of the store buffer at the L2 cache to cause corresponding entries to be invalidated.

20. The multiprocessor system of claim 11, wherein priority between L1 caches is determined based upon identifiers for processors attached to the L1 caches.

* * * * *